(12) United States Patent
Hesse et al.

(10) Patent No.: US 10,300,555 B2
(45) Date of Patent: May 28, 2019

(54) LASER CUTTING MACHINE AND METHOD FOR CUTTING WORKPIECES OF DIFFERENT THICKNESSES

(71) Applicant: TRUMPF Werkzeugmaschinen GmbH + Co. KG, Ditzingen (DE)

(72) Inventors: Tim Hesse, Ditzingen (DE); Tobias Kaiser, Leonberg (DE)

(73) Assignee: TRUMPF Werkzeugmaschinen GmbH + Co. KG, Ditzingen (DE)

(*) Notice: Subject to any disclaimer, the term of this patent is extended or adjusted under 35 U.S.C. 154(b) by 736 days.

(21) Appl. No.: 14/689,452

(22) Filed: Apr. 17, 2015

(65) Prior Publication Data
US 2015/0217402 A1 Aug. 6, 2015

Related U.S. Application Data

(63) Continuation of application No. PCT/EP2013/003094, filed on Oct. 15, 2013.

(30) Foreign Application Priority Data

Oct. 19, 2012 (DE) .......... 10 2012 219 074

(51) Int. Cl.
*B23K 26/06* (2014.01)
*B23K 26/38* (2014.01)
(Continued)

(52) U.S. Cl.
CPC ........ *B23K 26/064* (2015.10); *B23K 26/0648* (2013.01); *B23K 26/08* (2013.01); *B23K 26/38* (2013.01)

(58) Field of Classification Search
CPC .. B23K 26/064; B23K 26/0648; B23K 26/08; B23K 26/38; B23K 26/0652
(Continued)

(56) References Cited

U.S. PATENT DOCUMENTS 8,781,269 B2 7/2014 Huber et al.
8,804,238 B2 8/2014 Rupp et al.
(Continued)

FOREIGN PATENT DOCUMENTS

CN 201471090 U 5/2010
DE 202010006047 U1 8/2010
(Continued)

OTHER PUBLICATIONS

Sako et al. (JP 2012-024782 A), Machine Translation.*
(Continued)

*Primary Examiner* — Dana Ross
*Assistant Examiner* — James F Sims, III
(74) *Attorney, Agent, or Firm* — Fish & Richardson P.C.

(57) ABSTRACT

A laser cutting machine for cutting a workpiece having a first thickness (using a first processing laser beam having a first laser beam characteristic and a workpiece having a different second thickness using at least a second processing laser beam having a different second laser beam characteristic includes a laser source for producing a unprocessed laser beam having a laser wavelength of less than 4 μm, a device which forms from the unprocessed laser beam the processing laser beams, and a control unit which controls the device in dependence on the thickness of the workpiece to be cut.

13 Claims, 1 Drawing Sheet

(51) Int. Cl.
B23K 26/064 (2014.01)
B23K 26/08 (2014.01)

(58) Field of Classification Search
USPC ............... 219/121.67, 121.72; 385/115, 121
See application file for complete search history.

(56) References Cited

U.S. PATENT DOCUMENTS

| | | | |
|---|---|---|---|
| 8,934,742 B2 | 1/2015 | Voss et al. | |
| 2003/0052104 A1* | 3/2003 | Matsumoto | B32B 18/00 |
| | | | 219/121.81 |
| 2007/0097523 A1* | 5/2007 | Yamagata | G02B 26/10 |
| | | | 359/797 |
| 2010/0116799 A1 | 5/2010 | Momoi et al. | |
| 2010/0187209 A1* | 7/2010 | Miyazaki | B23K 26/1476 |
| | | | 219/121.84 |
| 2012/0212801 A1 | 8/2012 | Rothenberg | |

FOREIGN PATENT DOCUMENTS

| | | |
|---|---|---|
| DE | 102010003750 A1 | 10/2011 |
| EP | 0778564 A1 | 6/1997 |
| JP | 05305475 A | 11/1993 |
| JP | 1158054 A | 3/1999 |
| JP | 11245074 A | 9/1999 |
| JP | 2011221191 A | 11/2011 |
| JP | 2012024782 A | 9/2012 |

OTHER PUBLICATIONS

International Search Report from corresponding PCT Application No. PCT/EP2013/003094, dated Feb. 28, 2014, 6 pages.
Office Action in Chinese Application No. 201380059732.1, dated Dec. 4, 2018, 11 pages (with English translation).

* cited by examiner

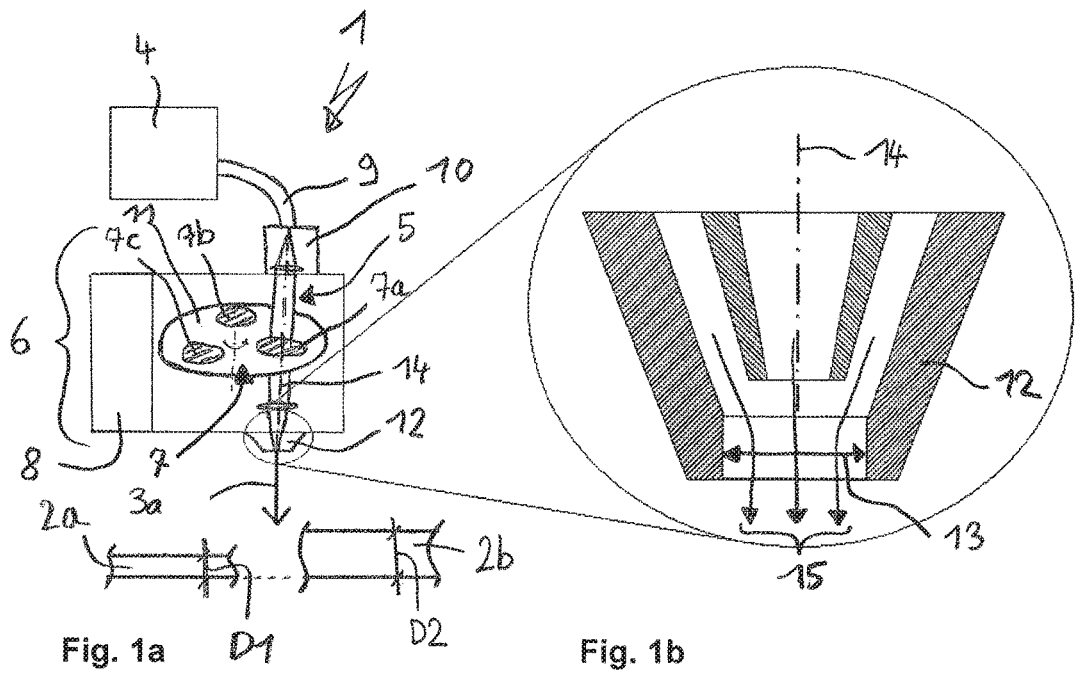
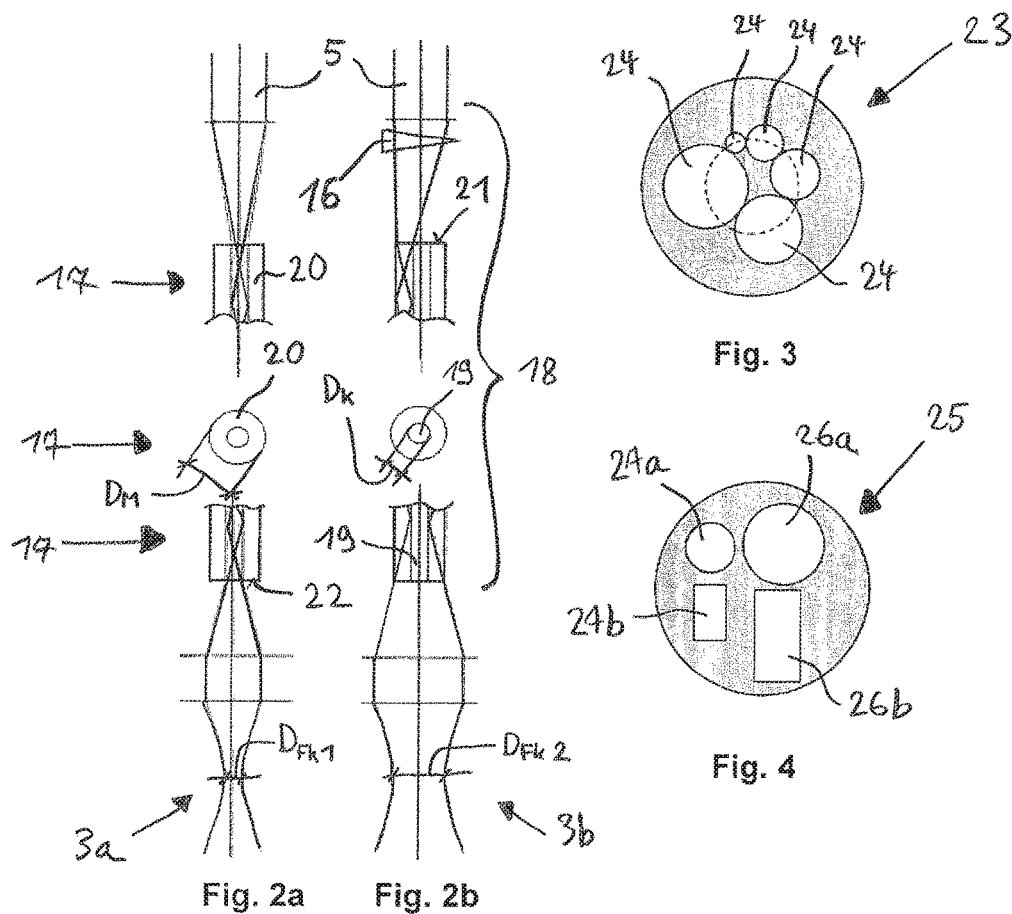

LASER CUTTING MACHINE AND METHOD FOR CUTTING WORKPIECES OF DIFFERENT THICKNESSES

CROSS-REFERENCE TO RELATED APPLICATIONS

This application is a continuation of and claims priority under 35 U.S.C. § 120 to PCT Application No. PCT/EP2013/003094 filed on Oct. 15, 2013, which claimed priority to German Application No. DE 10 2012 219 074.0, filed on Oct. 19, 2012. The contents of both of these priority applications are hereby incorporated by reference in their entirety.

TECHNICAL FIELD

The present invention relates to a laser cutting machine and a method for cutting workpieces of different thicknesses using a laser beam.

BACKGROUND

The industrial laser processing of metal workpieces has rapidly developed in recent years as a result of technical advances in this field. With this development, the expectations and demands on the workpieces to be processed have continuously increased and customers are demanding increasingly individual, complex products or workpieces within increasingly short production times. This also involves workpieces to be produced more frequently having a complex structure with at least two or more different workpiece thicknesses or individual workpieces each having a defined thickness having to be produced in increasingly small batches in a shorter time and with high cutting quality.

In order to cut a workpiece with a comparatively large thickness (e.g., thick metal sheets), a comparatively large focal diameter of the processing laser beam is generally desirable so that the cutting gap is sufficiently wide that slag produced during the workpiece processing operation can be blown out. In contrast, during the processing of workpieces with comparatively small thicknesses (e.g., thin metal sheets), in particular for rapid laser cutting, a comparatively small focal diameter is desirable.

However, continuous refitting of laser processing machines (e.g., from machines with small focal diameters to machines with comparatively large focal diameters) is generally undesirable owing to the disproportionately high level of complexity often needed to comply with the above-described demands on the workpiece production. The gradual processing of a workpiece with different thicknesses firstly on a first laser processing machine (e.g., a laser cutting machine with a small focal diameter) and subsequently (e.g., after interim transfer of the workpiece) on a second laser processing machine (e.g., with a comparatively large focal diameter) also does not represent a more economical alternative.

SUMMARY

Laser cutting machines and methods for cutting workpieces of different thicknesses using a laser beam that provides reliable, high-quality, economical and in particular rapid manner are disclosed.

In certain embodiments, the laser cutting machine for cutting a workpiece having a first thickness using a first processing laser beam having a first laser beam characteristic and a workpiece having a different second thickness using at least a second processing laser beam having a different second laser beam characteristic, includes: a laser source, in particular a solid-state laser, for producing a unprocessed laser beam having a laser wavelength of less than 4 µm, a processing head and a device which forms from the unprocessed laser beam the processing laser beams having the first and the second laser beam characteristic, and a control unit which controls the device in accordance with the thickness of the workpiece to be cut. The laser beam characteristic (e.g., the beam quality of the processing laser beams) is advantageously changed in dependence of the thickness of the workpiece to be processed. The change of the laser beam characteristic, which may be carried out in situ and during the workpiece processing operation, may be accomplished without a complex refitting of the laser cutting machine or transfer of the workpiece to be processed from a first laser cutting machine to a second laser cutting machine.

In certain implementations, it is initially determined in which thickness category a workpiece to be processed is included. For example, so-called thin metal sheets with a workpiece thickness smaller than, e.g., 20 mm can be categorized in a first thickness category and processed using the first processing laser beam. Accordingly, so-called thick metal sheets with a workpiece thickness greater than, e.g., 20 mm can be categorized in the second thickness category and processed using the second processing laser beam. The device which forms the processing laser beams with different laser characteristics can be controlled either using the control unit which selects the processing laser beam with the suitable laser characteristic depending on the workpiece thickness, or can alternatively also be manually activated.

In some implementations, the laser cutting machine includes a cutting gas nozzle which has a nozzle diameter of at least 3 mm. Owing to such a cutting gas nozzle, which operates in accordance with the bypass flow principle and during operation uses a comparatively small volume flow, a laser cut with high cutting quality (good cut) is advantageously possible. Owing to laser cutting with a cutting gas nozzle which has an inner nozzle diameter greater than 3 mm, greater coverage of the cutting gap is achieved. In order to further increase the quality of the cutting result, the cutting gas nozzle may be used during the laser cutting with an operating spacing of less than 1 mm. Furthermore, in order to further increase the cutting quality, the nozzle diameter with small workpiece thicknesses (for example, thicknesses less than 20 mm) can be selected to be smaller than with large workpiece thicknesses (for example, thicknesses greater than 20 mm). Consequently, the cutting gas is coupled into the cutting gap in an optimum manner. In particular, with such a laser cutting machine, such high cutting qualities can also be achieved with thick metal sheets.

In some embodiments, the device is formed by an adjustable optical deflection unit and a compound fiber having a multiple fibers, and with the unprocessed laser beam being coupled at one end of the compound fiber by the optical deflection unit selectively into one or more fibers and being decoupled at the other end as a processing laser beam having a different laser beam characteristic. Owing to the compound fiber and the optical deflection unit, the beam quality or the laser beam characteristic of the processing laser beam can be changed in dependence with the thickness of the workpiece to be processed on the beam path between the production location (of the laser source) and the processing location (on the workpiece). The compound fiber may make the arrangement of a movable optical lens unit for focal diameter adjustment in the laser processing head unnecessary, whereby a significantly smaller (more compact) and lighter construction of the processing head and consequently higher processing speeds can be produced. At the same time, the complete processing range (thick metal sheet/thin metal sheet, burning cut/melting cut) is maintained. In order to couple the unprocessed laser beam into the compound fiber beam, the optical deflection unit may be constructed, for example, as a movable prism or as a wedge plate.

In certain implementations, the compound fiber has an inner core fiber and at least one outer cladding fiber. In order to produce the different laser beam characteristics, the unprocessed laser beam is selectively coupled either at least into an inner core fiber of the compound fiber or at least into at least one outer cladding fiber of the compound fiber. Using a core/cladding fiber optic cable (so-called dual clad fiber laser light cable) as an optical fiber, it is possible to cut, for example, thick construction steel (e.g., sheet thicknesses greater than 20 mm) of very good quality. In some cases, the core fiber has a fiber core diameter of less than 100 µm so that in particular thin metal sheets can be processed in a particularly rapid manner and with a particularly high-grade cutting quality. In certain cases, the cladding fiber further has an outer diameter which is greater than three times the fiber core diameter of the core fiber.

In some embodiments, the compound fiber has multiple individual fibers with cross-sectional surface-areas and/or cross-section shapes of different sizes. In order to produce the different laser beam characteristics, the unprocessed laser beam is selectively coupled into one or more of the individual fibers with cross-sectional surface-areas and/or cross-section shapes of different sizes.

In some implementations, the compound fiber has at least four individual fibers, two first individual fibers of which have cross-sectional surface-areas of substantially the same size each with different cross-section shapes and the other two second individual fibers of which have different cross-sectional surface-areas of substantially the same size each with different cross-section shapes. The two first individual fibers each have first cross-sectional surface-areas of the same size. The two second individual fibers also have two cross-sectional surface-areas of the same size, the cross-sectional surface-areas thereof being different from (e.g., larger than) the cross-sectional surface-areas of the first two individual fibers. Consequently, the first two individual fibers or the processing laser beam which is formed by these individual fibers can be used, for example, for thin metal sheets and the second two individual fibers or the processing laser beam which is formed in each case by these individual fibers can be used for thick metal sheets. Owing to the fact that the first two and second two individual fibers further each have different cross-section shapes (for example, round and rectangular or round and oval cross-section shapes), it is further possible for special applications, such as, for example, a more rapid laser cut and a further increased cutting quality, to be carried out. For example, using the processing laser beam which is produced using a round individual fiber, a direction-independent processing of thick or thin workpieces can be carried out. Rectangular individual fibers can, in contrast, be used for comparatively rapid laser cuts. To this end, the unprocessed laser beam is intended to be accordingly coupled into the respective individual fibers.

In some embodiments, the device is formed by a beam forming element or by a plurality of different beam forming elements which are arranged in the processing head and which can be selectively moved into the beam path of the laser beam. The beam forming element or the plurality of different beam forming elements in each case lead(s) to another laser beam characteristic. In the case of a single beam forming element, this is provided either in or outside the beam path, whereby two different laser beam characteristics are also provided. Preferably, the beam forming elements are constructed as diffractive and/or refractive optical elements.

In some implementations, the invention features methods for cutting workpieces of different thicknesses using a processing laser beam, workpieces having a first thickness being selectively processed using a first processing laser beam having a first laser beam characteristic and workpieces having a different thickness being processed using at least a second processing laser beam having a different second laser beam characteristic, and the two processing laser beams being formed by a unprocessed laser beam. Substantially the same advantages may be achieved as with the laser cutting machines discussed above. Naturally, the methods are not limited to a first and second processing laser beam, but where applicable other processing laser beams having additional laser beam characteristics can be used to process other thickness categories.

In certain implementations, the unprocessed laser beam is coupled at one fiber end of a compound fiber selectively into one or more fibers and is decoupled as processing laser beams having different laser beam characteristics from the other fiber end. This variant represents a particularly simple and effective possibility for changing the laser beam characteristics (or the change between two laser beam characteristics) for processing workpieces with different thicknesses. Owing to the selective coupling into one or more fibers, different laser beam characteristics (for example, different beam diameters or focal points) of the processing laser beams are provided at the decoupling side. The coupling of the unprocessed laser beams into the compound fibers can be carried out at a location spatially remote from the direct processing region of the workpiece so that advantageously in order to process the workpieces only the decoupling-side end of the compound fiber has to be guided in the vicinity of the processing region. This may enable, in particular, a higher dynamic during laser processing of the workpieces. The first and the second laser beam characteristic can differ with respect to the focal diameter and/or the laser beam diameter.

Other advantages of the invention will be appreciated from the claims, the description and the drawings. The features mentioned above and those set out below may also be used individually per se or together in any combination. The embodiments shown and described are not intended to be understood to be a conclusive listing but are instead of exemplary character for describing the invention.

DESCRIPTION OF DRAWINGS

FIG. 1a shows an embodiment of a laser cutting machine for cutting workpieces of different thicknesses with a device for selectively producing two processing laser beams having a different laser beam characteristic using beam forming elements;

FIG. 1b is an enlarged partial cut-out of a cutting gas nozzle of the laser cutting machine from FIG. 1a;

FIGS. 2a, 2b show a device according to the invention for selectively producing processing laser beams having a different laser characteristic from the same unprocessed laser beam using a dual clad fiber;

FIG. 3 shows another device according to the invention for selectively producing processing laser beams having a different laser characteristic using a compound fiber which includes multiple individual fibers having different diameters; and FIG. 4 shows another device for selectively producing processing laser beams having a different laser characteristic using a compound fiber which comprises a plurality of individual fibers having cross-sectional surface-areas and/or cross-section shapes of different sizes.

DETAILED DESCRIPTION

FIG. 1a shows a laser cutting machine 1 for laser cutting workpieces (for example, metal sheets) of different thicknesses using a processing laser beam. In this instance, workpieces 2a having a smaller thickness D1 are processed using a first processing laser beam 3a and a workpiece 2b having a larger thickness D2 is processed using a second processing laser beam 3b. The laser cutting machine 1 has a laser source 4 for producing an unprocessed laser beam 5 and a processing head 6 for focusing the processing laser beams 3a, 3b on the workpiece 2a, 2b to be processed. On the processing head 6 there is arranged a device 7 which is formed using a plurality of different beam forming elements 7a-7c and which forms from the unprocessed laser beam 5, by selectively moving the beam forming elements 7a-7c into the beam path of the unprocessed laser beam 5, the processing laser beams 3a, 3b having a first and having a second laser beam characteristic. The different laser beam characteristics can be seen, for example, in different focal diameters and/or laser beam diameters and/or laser wavelengths (cf. FIGS. 2a, 2b). The laser cutting machine 1 further has a control unit 8 which controls the device 7 in dependence with the thickness D1, D2 of the workpiece 2a, 2b to be cut. The laser wavelength of the laser source 4 is smaller than 4 μm, the laser source 4 in particular being a solid-state laser.

The device 7 comprises in this instance, for example, the three different beam forming elements 7a-7c which may be diffractive and/or refractive optical elements. Of course, the device 7 may in principle also be formed by a single beam forming element 7a, 7b or 7c. The unprocessed laser beam 5 which is supplied using an optical fiber 9 is decoupled using a collimator 10 as a collimated beam, subsequently passes through the beam forming element 7a-7c which is located in the beam path and which changes the laser beam in each case in terms of the laser characteristic thereof, for example, in terms of the laser beam intensity thereof, and is decoupled using a focusing lens from the processing head 6 as a processing laser beam 3a, 3b. The three beam forming elements 7a-7c may, as in this case, be provided on a rotary disc 11 which is rotated in accordance with the workpiece thickness D1, D2 to be processed manually using an operator or using the control unit 8 until the beam forming element 7a-7c desired in each case is located in the beam path. The control unit 8 is advantageously part of the NC machine control unit of the laser cutting machine 1 in order to form in accordance with the programmed workpiece thickness of an NC program running on the NC machine control unit 8 either one or the other processing laser beam 3a, 3b. Alternatively, however, the control unit 8 may also detect the workpiece thickness using sensors which are not illustrated and control the rotary disc 11 accordingly. For example, thinner metal sheets (thin metal sheets) having a thickness D1 up to approximately 20 mm can be processed using one processing laser beam 3a and thicker metal sheets (thick metal sheets) having a thickness D2 greater than approximately 20 mm can be processed using the other processing laser beam 3b.

The laser cutting machine 1 further has a cutting gas nozzle 12 which has a nozzle diameter 13 of at least 3 mm and which is illustrated in a state drawn to an enlarged scale in FIG. 1b. The cutting gas nozzle 12 which is arranged coaxially with the laser beam axis 14 produces a gas flow 15 which is directed against the surface of the workpieces 2a, 2b to be processed, in particular into a cutting gap which is formed in the workpieces 2a, 2b. Preferably, the cutting gas nozzle 12 operates in accordance with the bypass flow principle schematically illustrated in FIG. 1b so that, during the laser cutting operation, it requires a comparatively small volume flow and consequently only a small cutting gas consumption. Owing to the cutting gas nozzle 12, a high-quality cut (for example, without burr formation) can be produced not only on workpieces 2a with a comparatively small thickness D1 (for example, thin metal sheets) but also on workpieces 2b having larger thicknesses D2 (for example, thick metal sheets). Of course, as an alternative to the cutting gas nozzle 12, other cutting gas nozzles having a nozzle diameter 13 of at least 3 mm may also be used.

FIGS. 2a and 2b show a device 18 which is formed using an adjustable optical deflection unit 16 and a compound fiber 17 for selectively producing processing laser beams 3a, 3b with different laser characteristic from the unprocessed laser beam 5. The compound fiber 17 is constructed as a dual-clad fiber having an inner core fiber 19 (diameter DK) and having an outer cladding fiber 20 (outer diameter DM) which surrounds the inner core fiber 19. At one fiber end 21 of the compound fiber 17, the unprocessed laser beam 5 of a laser source which is not shown here is coupled by the optical deflection unit 16 selectively into the core fiber 19 and/or the cladding fiber 20 and, depending on the fibers 19, 20 into which the unprocessed laser beam 5 has been coupled, is discharged therefrom with different laser beam characteristics, for example, with different laser beam diameters or focal diameters DFK1, DFK2, at the other fiber end 22 as a processing laser beam 3a or 3b. In order to selectively couple into the fibers 19, 20 of the compound fiber 17, the deflection device 16 which is controlled by the control unit 8 or which can alternatively be actuated manually by an operator, may be provided, for example, in the form of a wedge plate 16 which can be moved into the beam path of the unprocessed laser beam 5. Compound fibers 17 which have a core fiber 19 with the smallest possible fiber core diameter DK<100 μm and a cladding fiber 20 having an outer diameter DM greater than three times the fiber core diameter DK have been found to be particularly advantageous for producing different laser characteristics.

If the unprocessed laser beam 5 is coupled, for example, only into the core fiber 19, a small focal diameter DFK1 is produced having a high beam quality which is advantageous with high feed speeds and during the laser processing of thin metal sheets (D1≤20 mm). If the unprocessed laser beam 5 is coupled into the cladding fiber 20, a larger focal diameter DFK2 with a comparatively low beam quality is produced, which in turn is advantageous at lower feed speeds and during laser processing of thick metal sheets (D2>20 mm). The large focal diameter DFK2 is particularly advantageous in that focal positions close to the upper sheet side can be selected, whereby an infeed of the cutting edge at the upper sheet side can be prevented. Owing to the large cutting gap, the gas pressure during laser processing can further be selected to be smaller.

Of course, in place of the dual-clad fiber shown, multi-clad fibers which have an inner core fiber and a plurality of outer cladding fibers may also be provided so that, by selective coupling into these fibers, many different laser beam characteristics may be produced. It is also possible that the inner core fiber and the outer cladding fiber, in a manner different from the round cross-section, may also have other cross-section shapes and/or cross-sectional surface-areas. For example, oval and/or rectangular cross-section shapes are conceivable.

In place of the dual-clad fiber 17 shown in FIGS. 2a and 2b, in order to produce different laser characteristics it is also possible to use the compound fiber 23 which is shown in FIG. 3 and which has a large number of parallel individual fibers 24 each with diameters of different sizes. In a similar manner to FIGS. 2a and 2b, an unprocessed laser beam may be selectively coupled into one or more of the individual fibers 24 and be decoupled as processing laser beams each with different laser beam characteristics.

In place of the compound fibers 17, 23 shown in FIGS. 2a, 2b, 3, it is finally also possible to use, in order to produce different laser characteristics, the compound fiber 25 which is shown in FIG. 4 and which has at least four individual fibers, of which two first individual fibers 26a, 26b have cross-sectional surface-areas of the same size each with different cross-section shapes (in this instance, a large circular and a large rectangular cross-section) and of which the other two second individual fibers 27a, 27b have different cross-sectional surface-areas of the same size each having different cross-section shapes (in this instance, a small circular and a small rectangular cross-section). The processing laser beam which is formed in each case by the first two individual fibers 26a, 26b can be used, for example, for thick metal sheets D2 and the processing laser beam formed by the second two individual fibers 27a, 27b can be used for thin metal sheets D1. Owing to the different cross-section shapes (in this instance, circular and rectangular), it is advantageously possible to carry out different special applications during laser cutting. For example, when cutting a thin metal sheet D1 with a processing laser beam which is decoupled from the small round individual fiber 27a, a direction-independent normal cut can be carried out, whereas with a processing laser beam decoupled from the small rectangular individual fiber 27b, a direction-dependent, more rapid laser cut can be carried out. Of course, it is also advantageously possible to use more than two cross-section shapes per cross-sectional surface-area of the same size or more than two identical cross-section sizes.

A number of embodiments have been described. Nevertheless, it will be understood that various modifications may be made without departing from the spirit and scope of the invention. Accordingly, other embodiments are within the scope of the following claims.

What is claimed is:

1. A laser cutting machine for cutting a workpiece having a first thickness and a workpiece having a second thickness different from the first thickness, the laser cutting machine comprising:
   a laser source for producing an unprocessed laser beam having a laser wavelength of less than 4 μm;
   a compound fiber comprising a plurality of parallel, non-concentric fibers, wherein the plurality of fibers of the compound fiber have cross-sectional surface-areas and/or cross-section shapes of different sizes;
   an adjustable optical deflection unit configured to selectively direct the unprocessed laser beam into one or more of the fibers of the compound fiber by a movement of the adjustable optical deflection unit, wherein a laser beam characteristic of a laser beam exiting the compound fiber differs depending upon which fibers of the compound fiber receive the unprocessed laser beam; and
   a control unit configured to control a movement of the adjustable optical deflection unit in accordance with a thickness of the workpiece to be cut.

2. The laser cutting machine of claim 1, wherein the plurality of fibers of the compound fiber comprises a plurality of inner core fibers and at least one outer cladding fiber.

3. The laser cutting machine of claim 2, wherein the inner core fiber has a fiber core diameter of less than 100 μm.

4. The laser cutting machine of claim 1, wherein the adjustable optical deflection unit comprises one or more beam forming elements arranged in a processing head, the beam forming elements configured to be selectively moved into a beam path of the unprocessed laser beam.

5. The laser cutting machine of claim 4, wherein the beam forming elements are diffractive and/or refractive optical elements.

6. The laser cutting machine of claim 1, further comprising a cutting gas nozzle having a nozzle diameter of at least 3 mm.

7. The laser cutting machine of claim 1, wherein the laser source comprises a solid state laser.

8. A laser cutting machine for cutting a workpiece having a first thickness and a workpiece having a second thickness different from the first thickness, the laser cutting machine comprising:
   a laser source for producing an unprocessed laser beam having a laser wavelength of less than 4 μm;
   a compound fiber comprising a plurality of fibers;
   an adjustable optical deflection unit configured to selectively direct the unprocessed laser beam into one or more of the fibers of the compound fiber by a movement of the adjustable optical deflection unit, wherein a laser beam characteristic of a laser beam exiting the compound fiber differs depending upon which fibers of the compound fiber receive the unprocessed laser beam; and
   a control unit configured to control a movement of the adjustable optical deflection unit in accordance with a thickness of the workpiece to be cut,
   wherein the plurality of fibers of the compound fiber comprises a plurality of inner core fibers and at least one outer cladding fiber, and
   wherein the cladding fiber has an outer diameter which is greater than three times the largest fiber core diameter of the inner core fibers.

9. The laser cutting machine of claim 8, wherein the plurality of fibers of the compound fiber have cross-sectional surface-areas and/or cross-section shapes of different sizes.

10. The laser cutting machine of claim 8, wherein the adjustable optical deflection unit comprises one or more beam forming elements, the beam forming elements configured to be selectively moved into a beam path of the unprocessed laser beam.

11. A laser cutting machine for cutting a workpiece having a first thickness and a workpiece having a second thickness different from the first thickness, the laser cutting machine comprising:
   a laser source for producing an unprocessed laser beam having a laser wavelength of less than 4 μm;
   a compound fiber comprising a plurality of fibers;

an adjustable optical deflection unit configured to selectively direct the unprocessed laser beam into one or more of the fibers of the compound fiber by a movement of the adjustable optical deflection unit, wherein a laser beam characteristic of a laser beam exiting the compound fiber differs depending upon which fibers of the compound fiber receive the unprocessed laser beam; and a control unit configured to control a movement of the adjustable optical deflection unit in accordance with a thickness of the workpiece to be cut, wherein the plurality of fibers of the compound fiber have cross-sectional surface-areas and/or cross-section shapes of different sizes, and wherein the compound fiber comprises at least four individual fibers including two first individual fibers having cross-sectional surface-areas of the same size each with different cross-section shapes and two second individual fibers having cross-sectional surface-areas of the same size each with different cross-section shapes.

12. A method for cutting workpieces of different thicknesses, comprising:

providing an unprocessed laser beam;

in accordance with a thickness of the workpiece, selectively directing the unprocessed laser beam into one or more fibers of a compound optical fiber, comprising a plurality of parallel, non-concentric fibers, by movement of an adjustable optical deflection unit, wherein a laser beam characteristic of a processing laser beam exiting the compound fiber differs depending upon which fibers of the compound fiber receive the unprocessed laser beam, the laser beam characteristic of the processing laser beam differing depending on the thickness; and cutting the workpiece with the processing laser beam.

13. The method of claim 12, wherein the characteristic of the processing laser beam that differs is a focal diameter of the processing laser beam and/or a laser beam diameter of the processing laser beam.

* * * * *